United States Patent [19]
Lawrence et al.

[11] Patent Number: 6,052,220
[45] Date of Patent: *Apr. 18, 2000

[54] OPTICAL AMPLIFIER AND PROCESS FOR AMPLIFYING AN OPTICAL SIGNAL PROPAGATING IN A FIBER OPTIC EMPLOYING AN OVERLAY WAVEGUIDE AND STIMULATED EMISSION

[75] Inventors: Brian L. Lawrence, Watervliet; Kevin J. McCallion, Albany; Michael H. Shimazu, Valatie, all of N.Y.

[73] Assignee: Molecular OptoElectronics Corporation, Watervliet, N.Y.

[ * ] Notice: This patent is subject to a terminal disclaimer.

[21] Appl. No.: 08/928,578

[22] Filed: Sep. 12, 1997

Related U.S. Application Data

[63] Continuation-in-part of application No. 08/786,047, Jan. 21, 1997, Pat. No. 5,815,309.

[51] Int. Cl.⁷ ...................................................... H01S 3/00
[52] U.S. Cl. .............................. 359/341; 359/33; 385/30
[58] Field of Search .................................... 359/341, 333; 385/30

[56] References Cited

U.S. PATENT DOCUMENTS

| | | | |
|---|---|---|---|
| 4,603,940 | 8/1986 | Shaw et al. | 350/96.15 |
| 4,742,307 | 5/1988 | Thylen | 330/4.3 |
| 4,867,518 | 9/1989 | Stamnitz et al. | 350/96.15 |
| 4,895,422 | 1/1990 | Rand et al. | 350/96.15 |
| 5,005,175 | 4/1991 | Desurvire et al. | 372/6 |
| 5,064,265 | 11/1991 | Khanarian et al. | 385/130 |
| 5,274,495 | 12/1993 | Shirasaki | 359/330 |
| 5,396,362 | 3/1995 | Yakymyshyn et al. | 359/245 |
| 5,815,309 | 9/1998 | Lawrence et al. | 359/333 |

FOREIGN PATENT DOCUMENTS

| | | |
|---|---|---|
| 0136047 | 3/1985 | European Pat. Off. . |
| 0224070 | 3/1987 | European Pat. Off. . |
| 0477898 | 1/1992 | European Pat. Off. . |

OTHER PUBLICATIONS

Stewart, Kevin R. "Organic Crystals Give Optoelectronics a Boost", Photonics Spectra, pp. 104–108, Jul. 1994.

Bradley, D. "Plastics That Play on Lights", Science, vol. 261, pp. 1272 & 1273, Sep. 1993.

Marder et al., Nonlinear Optical Polymers: Discovery to Market in 10 Years?, Science, vol. 263, pp. 1706 & 1707, Mar. 1994.

McCallion et al., Investigation of Optical Fibre Switch Using Electro–Optic Interlays, Dec. 1991.

Millar et al., "Exposed–Core Single–Mode–Fiber Channel–Dropping Filter Using a High–Index Overlay Waveguide", Optical Society of America, vol. 12, No. 4, pp. 284–286, Apr. 1987.

Fawcett et al., "In–Line Fibre–Optic Intensity Modulator Using Electro–Optic Polymer", Electronic Letters, vol. 28, No. 11, pp. 985 & 986, May 1992.

Creaney et al., "Continuous–Fiber Modulator with High–Bandwidth Coplanar Strip Electrodes", IEEE Photonics Technology Letters, vol. 8, No. 3, pp. 355–357, Mar. 1996.

(List continued on next page.)

*Primary Examiner*—Mark Hellner
*Attorney, Agent, or Firm*—Heslin & Rothenberg, P.C.

[57] ABSTRACT

A side-polished fiber/overlay waveguide architecture and process for non-invasively implementing an optical amplifier are provided for an optical communications system. A "channel" overlay waveguide is employed to constrain for amplification optical energy evanescently coupled to the overlay waveguide from the side-polished optical fiber. One of two amplification methods can be employed. The first involves inducing stimulated emission with the overlay waveguide and the second uses a second order, non-linear frequency conversion to down-convert a high-power, short-wavelength pump signal into the waveguide to amplify the optical energy coupled thereto. Amplification of optical energy in the channel overlay waveguide can be established within a single beat length of evanescent removal to evanescent return of the optical energy to the side-polished fiber optic.

25 Claims, 12 Drawing Sheets

OTHER PUBLICATIONS

Panajoatov, Krassimir P., "Evanescent Field Coupling Between a Single–Mode Fiber and a Planar Waveguide with Absorption or Gain", Optical Society of America, vol. 13, No. 11, pp. 2468–2476, Nov. 1996.

K. Thragarajan et al., "Proton–exchanged periodically segmented waveguides in $LiNbO_3$", Optics Letters, vol. 19, No. 12, Jun. 15, 1994, pp. 880–882.

M.L. Bortz et al., "Increased asseptance bandwidth for quasi–phasematched second harmonic generation in $LiNbO_3$ waveguides", IEEE, Oct. 28, 1993, (2 p p.).

S. Helmfrid et al., "Optical Parametric Amplification of a 1.54–mm Single–Mode DFB Laser in a $Ti:LiNbO_3$ Waveguide", Journal of Lightwave Technology, vol. 11, No. 9, Sep. 1993, pp. 1459–1469.

R.A. Baumgartner et al., "Optical Parametric Amplification", IEEE Journal of Quantum Electronics, vol. QE–15, No. 6, Jun. 1979, pp. 432–444.

OPTICAL AMPLIFIER AND PROCESS FOR AMPLIFYING AN OPTICAL SIGNAL PROPAGATING IN A FIBER OPTIC EMPLOYING AN OVERLAY WAVEGUIDE AND STIMULATED EMISSION

CROSS-REFERENCE TO RELATED APPLICATIONS

This application is a continuation-in-part of commonly assigned, U.S. patent application Ser. No. 08/786,047, filed Jan. 21, 1997, entitled "Optical Amplifier And Process For Amplifying An Optical Signal Propagating In A Fiber Optic," which is hereby incorporated herein by reference in its entirety, now U.S. Pat. No. 5,815,309.

Further, this application relates to the following commonly assigned, co-pending U.S. patent applications:

U.S. patent application Ser. No. 08/786,033, filed Jan. 21, 1997, entitled "Electro-Optic Compound Waveguide Modulator."

U.S. patent application Ser. No. 08/785,871, filed Jan. 21, 1997, entitled "Compound Optical Waveguide and Filter Applications Thereof."

Each of these applications is also hereby incorporated by reference herein in its entirety.

TECHNICAL FIELD

The present invention relates in general to an optical amplifier employing the principles of amplification by stimulated emission or optical parametric amplification, and more particularly, to a side-polished fiber/overlay compound waveguide architecture and amplification method whereby amplification of an optical signal in a fiber optic communication system can be effectively achieved for any wavelength within the fluorescence emission bandwidth of a stimulated emission amplifier, or any phase-matchable signal wavelength in a parametric amplifier.

BACKGROUND OF THE INVENTION

There continues to be considerable interest in producing optical amplifiers for amplifying weak optical signals in both local and trunk optical networks. The high data rates and low optical attenuation associated with fiber optic lengths are well-established and continue to become more appreciated as fiber lengths become more economical compared with electrical coaxial cable alternatives. In spite of the relatively low magnitude of optical signal loss during transmission, the intrinsic linear attenuation law of lightwave energy in optical fibers necessitates optical repeater nodes to amplify and/or regenerate the digital optical bit streams or analog signals in long-haul terrestrial and undersea communication systems. Typically, unrepeated distances extend from 30 to 70 kilometers in length, depending upon the fiber loss at the selected transmission wavelength, which is ordinarily 1.31 or 1.55 microns, respectively.

One non-invasive approach to amplifying an optical signal in a fiber optic is presented in U.S. Pat. Nos. 4,955,025 and 5,005,175 entitled, "Fiber-Optic Lasers and Amplifiers" and "Erbium-Doped Fiber Amplifier," respectively. In these patents, a doped optical fiber is transversely coupled to a pump so that a weak optical input signal at some wavelength within the rare earth gain profile experiences a desired amplification. Pumping is effected by a separate laser or lamp which emits photons of appropriate energy, which is higher than that of the signal wavelength. Electrons in the doped fiber are excited from the ground state to one or more pump bands. The electrons then decay an amount corresponding to the wavelength at which the device operates. When a photon at the laser wavelength interacts with an excited atom, stimulated emission occurs. An output photon can thus originate from either previous spontaneous emission, stimulated emission, or an input signal.

Since erbium-doped amplifiers only operate at a specific wavelength, i.e., 1.53 $\mu$m–1.55 $\mu$m, other approaches to non-invasive optical amplifiers, operable for example at 1310 nm, are under investigation using semiconductor materials and variations of the rare-earth doped fibers. To date, however, serious problems have plagued development of these devices. Normally, semiconductor amplifiers provide low gain and require the fiber to be cut so that the signal can be extracted from and then re-launched into the optical fiber, while rare-earth doped amplifiers, like the Neodymium family of devices are unable to obtain sufficient gain at 1310 nm while minimizing inefficiencies due to lasing at the stronger optical transitions near 1064 nm and those due to pump-induced excited state absorption (ESA).

Thus, there exists a need in the optical telecommunications art for an improved optical amplifier and amplification method providing amplification characteristics commensurate with those attained by erbium-doped fibers at 1550 nm, but operable at any optical wavelength employed within an optical fiber. The present invention provides a compound waveguide architecture and amplification process to address this need.

DISCLOSURE OF THE INVENTION

Briefly described, the present invention comprises in one aspect a process for amplifying an optical signal propagating within an optical fiber. The process employs a channel overlay waveguide superimposed on a side-polished portion of the optical fiber. The channel overlay waveguide exhibits either strong fluorescence over a specific wavelength range or a second-order non-linear optical response. The process includes: transferring optical energy from the optical signal in the optical fiber to the channel overlay waveguide; amplifying the optical energy in the channel overlay waveguide to produce amplified optical energy; and returning the amplified optical energy to the optical signal in the optical fiber, whereby non-invasive amplification of the optical signal is achieved.

In a further aspect, the present invention comprises an amplifier to define an optical signal in a first waveguide employing a second waveguide. The second waveguide comprises a channel overlay waveguide which exhibits strong optical fluorescence or a non-linear response of second order. The amplifier includes a first evanescent means for coupling optical energy from the optical signal in the first waveguide to the channel overlay waveguide. Amplification means are provided for amplifying the optical energy in the channel overlay waveguide to produce amplified optical energy, and the amplifier includes second evanescent means, returning the amplified optical energy to the optical signal in the first waveguide, thus producing amplification of the optical signal.

In a still further aspect, an optical amplifier is provided for coupling to a side-polished fiber optic. The optical amplifier includes a channel overlay waveguide exhibiting strong optical fluorescence or a non-linear response of second order. The waveguide has a propagation axis alignable with a propagation axis of the side-polished fiber optic, and further includes a coupling surface through which optical energy is coupled to or from an optical signal propagating in the side-polished fiber optic when the channel overlay waveguide is placed in optical proximity to the fiber optic. The channel overlay waveguide constrains optical energy coupled thereto in dimensions orthogonal to the propagation axis of the channel overlay waveguide. This constraining operates to maintain the optical energy in the channel overlay waveguide in the vicinity of the side-polished fiber optic. The optical amplifier further includes amplification means for amplifying optical energy in the channel overlay waveguide to produce amplified optical energy for coupling back to the optical signal propagating in the side-polished fiber optic.

A method for fabricating an optical amplifier in accordance with the present invention is also presented. This method includes obtaining a side-polished portion of a fiber optic; superimposing a channel overlay waveguide exhibiting strong optical fluorescence or a non-linear response of second order over the side polished portion of the fiber optic, the channel overlay waveguide having a propagation axis aligned with a propagation axis of the fiber optic, the channel overlay waveguide including a coupling surface through which optical energy is evanescently coupled to or from the optical signal propagating in the fiber optic, the channel overlay waveguide constraining optical energy coupled thereto within a predefined area orthogonal to the propagation axis of the channel overlay waveguide, the predefined area being such as to maintain the optical energy in the channel overlay waveguide proximate to the fiber optic; and providing means for coupling an amplification signal or pump beam into the channel overlay waveguide for amplifying optical energy coupled into the waveguide from the side-polished portion of the fiber optic.

To restate, a polished fiber/overlay compound waveguide in accordance with the present invention comprises an optical amplifier for fiber optic communication systems. The device efficiently amplifies small signals at high speeds without creating discontinuity in the optical fiber network. The technique involves the use of either stimulated emission to amplify the optical signal, or non-linear frequency conversion to down-convert a high-power, short-wavelength pump to amplify the optical signal. Because the overlay waveguide does not require a fiber-like geometry, a variety of materials can be taken advantage of, for example, Nd:YAG. (Specifically, for amplification in the 1310 nm region of the spectrum, Nd-doped materials show promise, and high-power pump diodes at 808 nm already exist for this market.) Gain comparable to that produced by erbium-doped fiber amplifiers is attainable, but at any communication wavelength desired. Since the compound waveguide architecture of the present invention does not require discontinuity in the fiber optic system, losses typically associated with coupling signals in and out of the fiber optic are avoided, and no system instabilities are generated. Various inorganic and organic materials may be employed as the overlay waveguide.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIGS. 5a & 5b comprise cross-sectional views of multiple embodiments of an optical amplifier in accordance with the present invention, FIG. 5a comprising a cross-sectional view taken along line 5a—5a of FIG. 5b, and FIG. 5b comprising a cross-sectional view of the optical amplifier taken along line 5b—5b of shown in FIG. 5a;

BEST MODE FOR CARRYING OUT THE INVENTION

Figure 1A:
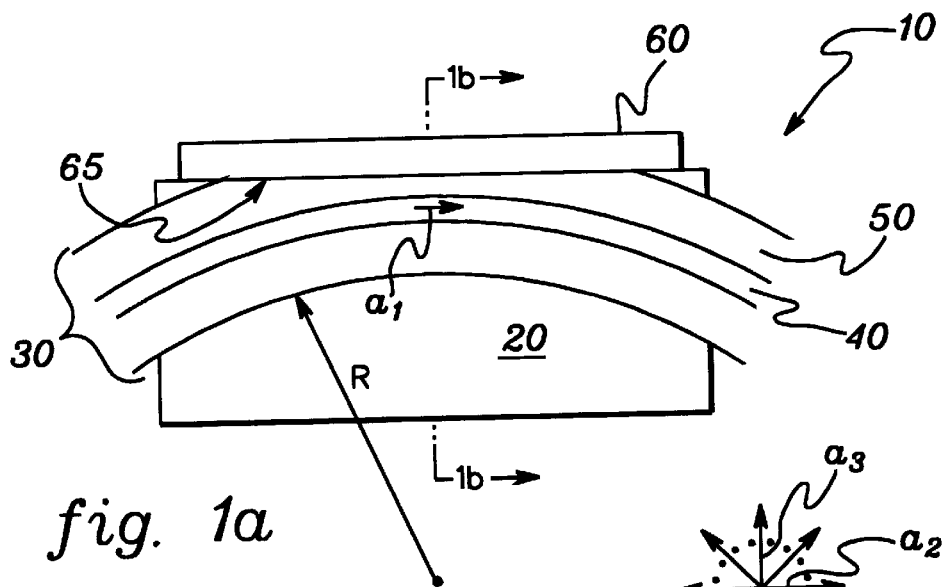
FIGS. 1a & 1b are cross-sectional views of a polished fiber/overlay compound waveguide in accordance with one aspect of the present invention, FIG. 1b being taken along line 1b—1b of FIG. 1a, and FIG. 1a being a cross-sectional view taken along line 1a—1a of FIG. 1b.

As noted, the present invention comprises a polished fiber/overlay compound waveguide architecture which implements an optical amplification method for fiber optic communication systems. The compound waveguide efficiently amplifies small signals that have been attenuated due to long distance transmission. The amplification is carried out by the process of stimulated emission, or by type I optical parametric amplification. Advantageously, as an all-optical signal amplifier, there is no discontinuity created in the optical fiber network, aiding in minimization of losses and instabilities.

As noted, the present technique involves one of two amplification methods. The first employs stimulated emission, whereby a material with strong fluorescence characteristics is pumped by a high-power laser diode. For example, neodymium-doped (Nd) yttrium aluminum garnet (YAG) (Nd:YAG) materials can be used as an overlay waveguide and pumped with an 808 nm 1 watt laser diode source. Any processable material can be used in this architecture which means any material that fluoresces can be utilized as an amplifier. In fact, members of the Neodymium family of glasses that were previously thought to be inefficient can be used. This is because the absence of a fiber discontinuity in a structure pursuant to the present invention prohibits the formation of a cavity, and minimizes the possibility of lasing at 1064 nm. Furthermore, because the material need not be drawn into a fiber, the subset of usable materials expands dramatically to include glasses and crystals in which excited state absorption is not a problem. The process of stimulated emission is well known. Thus, in accordance with the principles of the present invention, the constraints on the process are solely the concentration of fluorescent atoms or ions, the stimulated emission cross-section, and the availability of high-power pump sources. Given that lasers have existed for 30 years and given recent strides in the field of high-power laser diodes, none of these constraints are significant barriers to successful implementation of this invention.

The second amplification method involves the use of second-order nonlinear frequency conversion to down-convert a high-power, short-wavelength pump to amplify an optical signal propagating in a fiber optic. Parametric amplification is well-known and is limited only by device length and material non-linearities. With the compound architecture presented, existing materials can provide gain comparable to that provided by conventional erbium-doped fiber amplifiers, but at any wavelength desired provided a pump source exists. This is hardly a limitation, however, based on the versatility of current high-power diode laser technology.

The optical amplifier and amplification process in accordance with this invention employs a polished fiber/overlay compound waveguide architecture such as disclosed in detail in the above-referenced co-filed, commonly assigned U.S. patent applications. This compound architecture is briefly discussed below.

As is known, an optical waveguide can be a useful device for selective coupling of a specific optical signal from a portion of a broad-band fiber optic placed in optical proximity thereto. When a single-mode optical fiber, side-polished close to the core, is placed in proximity to a high index, "overlay" waveguide, the compound device's spectral response is that of a periodic bandstop wavelength filter. In this configuration, the waveguide is positioned in optical proximity to the fiber such that coupling occurs within the "evanescent" field of the optical signal transmitted within the fiber, resulting in a non-invasive coupler which does not suffer insertion losses associated with in-line couplers which interrupt the fiber core itself.

Figure 1B:
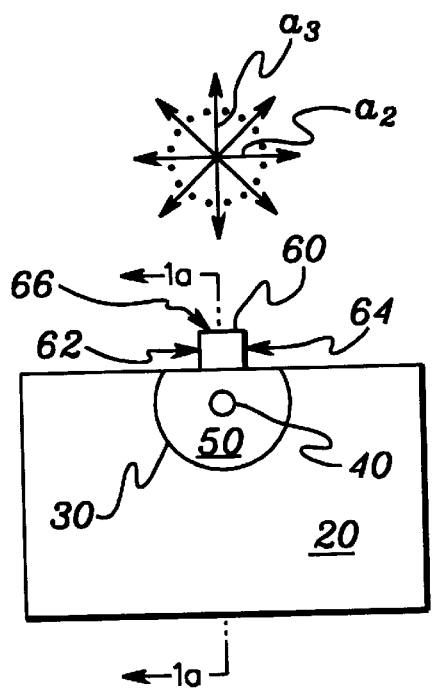
Figure 1C:
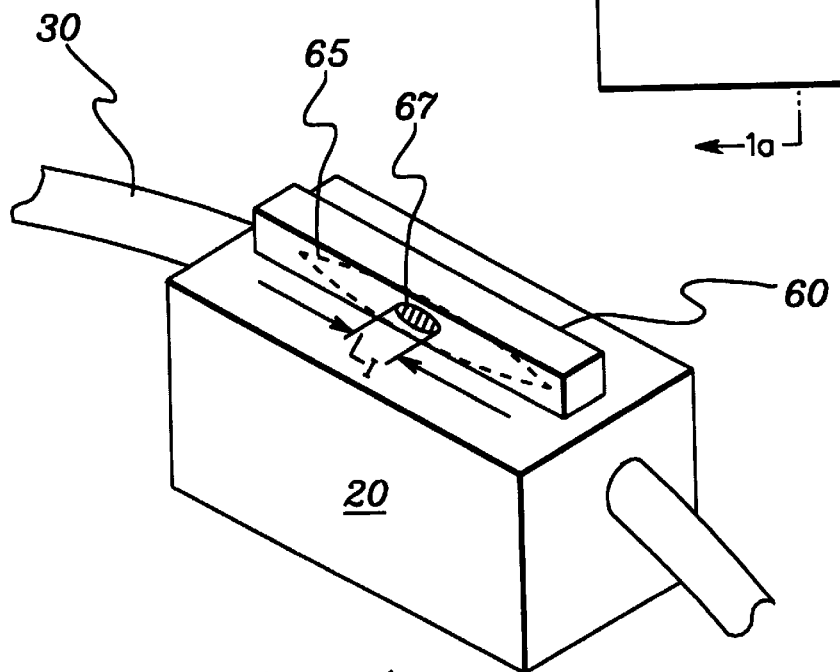
FIG. 1c comprises a perspective view of the compound waveguide depicted in FIGS. 1a & 1b.

Refer now to the drawing figures wherein the same reference numerals are used throughout multiple figures to designate the same or similar components. FIGS. 1a–1c depict an exemplary side-polished optical fiber/channel overlay compound waveguide, generally denoted 10, in accordance with the present invention. Compound waveguide 10 includes a substrate 20 having a first waveguide 30 running therethrough. Waveguide 30 comprises, for example, an optical fiber having a core 40 encased by cladding 50. The fiber transmits an optical signal through its core along propagation axis $a_1$. Assuming that optical fiber 30 comprises a single-mode optical fiber side-polished close to its core, optical coupling is possible to an overlay waveguide 60. The compound waveguide spectral response is that of a periodic bandstop wavelength filter.

In accordance with the invention, overlay waveguide 60 comprises a "channel" overlay waveguide which as discussed further below constrains optical energy within a predefined area orthogonal to the propagation axis of the optical energy within the channel overlay waveguide. The predefined area constrains the optical energy to the vicinity of the fiber optic. Overlay waveguide 60 optically couples the evanescent field exposed by the side-polishing of fiber optic 30. This evanescent coupling occurs at least over an optical interaction area 67 (having interaction length $L_I$) between channel waveguide 60 and fiber waveguide 30, which in exemplary device embodiment 10 is substantially determined by the size of the intersection 65 of the planar polished surface of fiber waveguide 30 and the lower, coupling surface of channel waveguide 60. Interaction length $L_I$ is typically much smaller than the length of the channel waveguide. As discussed further below, although FIGS. 1a–1c depict direct contact between fiber optic 30 and overlay waveguide 60, an intervening adhesive and/or index matching layer may be present at this coupling interface.

Evanescent coupling occurs between fiber optic 30 and waveguide 60 in the exposed evanescent field area of the optical signal transmitted along axis $a_1$ of fiber optic 30. This evanescent coupling causes optical energy to be transferred to the channel overlay waveguide from the optical signal propagating in fiber optic 30. Channel overlay waveguide 60 confines diffraction of coupled optical energy to a predefined area transverse, or orthogonal, to the axis of propagation of the optical energy within the overlay. This predefined area is in the vicinity of the fiber optic such that all coupled optical energy remains in the overlay substantially directly over the fiber optic and is therefore available for coupling back into the fiber optic subsequent to being amplified in accordance with the invention. Axis $a_2$ and axis $a_3$ are depicted in FIG. 1b as two exemplary axes orthogonal to the direction of propagation of optical energy within the channel overlay waveguide 60. Again, transfer or lateral diffraction of coupled optical energy within the overlay waveguide is constrained by the optical boundaries of the waveguide 60, which may be defined by the physical shape of the waveguide as explained further below. Further, pursuant to the present invention, this confinement of optical energy within the overlay waveguide is substantially directly over the fiber optic such that the optical energy coupled from the optical signal propagating in the fiber optic remains in the vicinity of the fiber optic for subsequent coupling back into the fiber optic along the length $L_I$ of the compound waveguide.

Figure 2A:
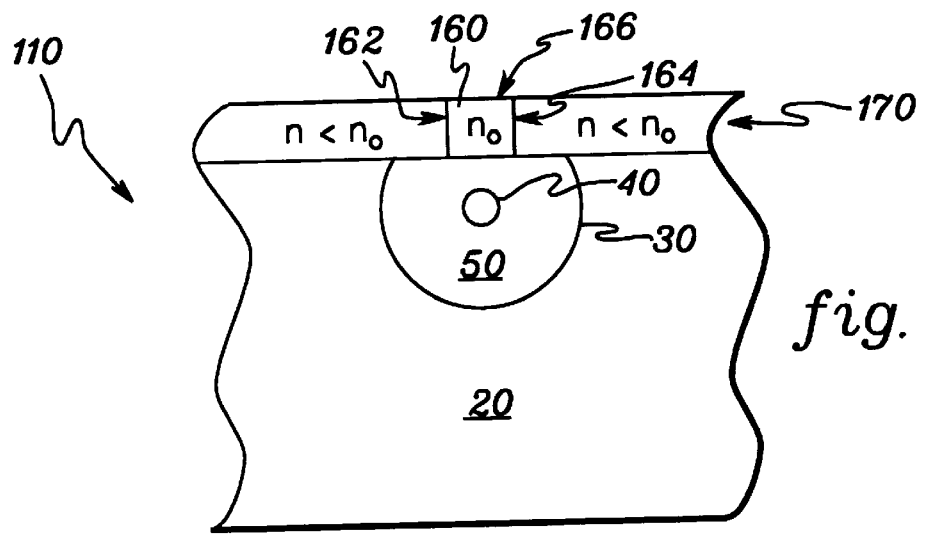
FIGS. 2a–2c comprise alternative embodiments of a channel overlay waveguide for a compound waveguide in accordance with the present invention.
Figure 2B:
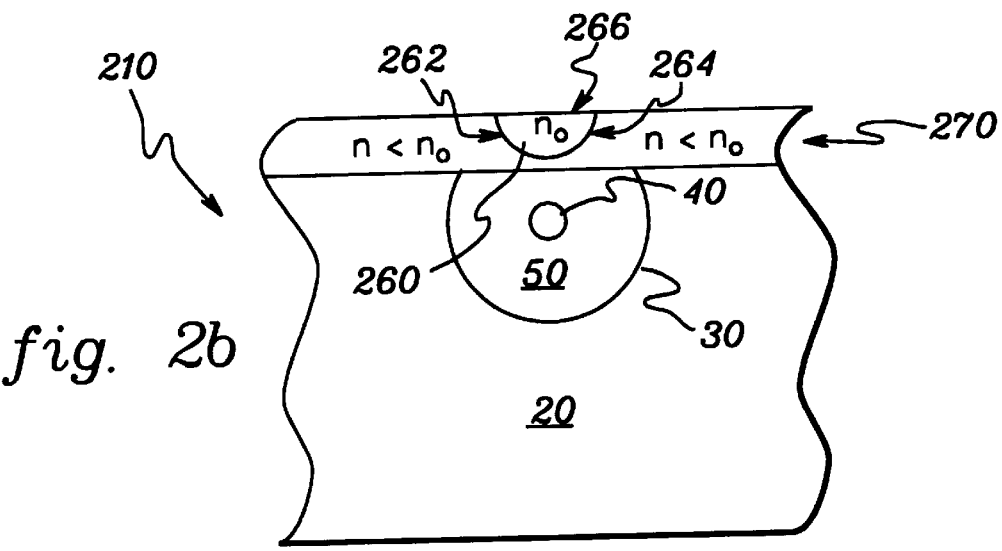
Figure 2C:
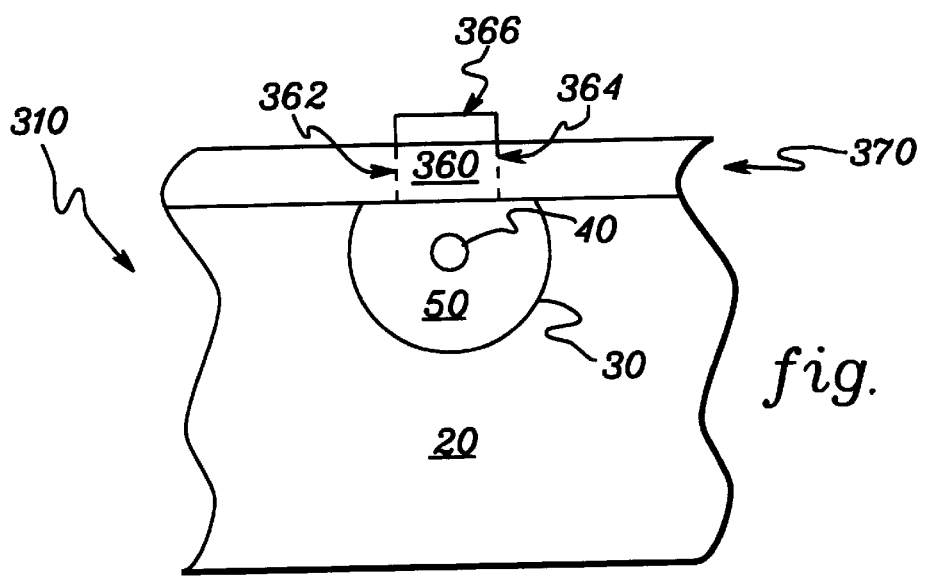

FIGS. 2a–2c depict various configurations of a channel overlay waveguide for use in accordance with the present invention. Each of these waveguides effects confinement of coupled optical energy to a defined area in a directional transverse or orthogonal to the axis of propagation of the optical energy within the waveguide.

In FIG. 2a, compound waveguide 110 includes layer 170 which is substantially planar. Layer 170 is deposited over substrate 20 containing the side-polished optical fiber including core 40 and clad 50. Layer 170 includes a channel waveguide 160 defined by a material with index of refraction $n_o$ which is greater than the indices of refraction of the material n on either side. Optical boundaries 162 and 164 at these regions of differing indices serve as the optical boundaries which confine optical energy within waveguide 160 transverse to an axis of propagation of the energy within the waveguide. As with boundaries 162 and 164, upper boundary 166 confines the optical energy along the vertical axis. Various fabrication techniques can be employed to realize the structure of FIG. 2a.

FIG. 2b presents a compound waveguide architecture 210 which similarly includes a layer 270 deposited over substrate 20 having a fiber optic embedded therein comprising core 40 and cladding 50. A channel waveguide 260 is formed by doping (e.g., via ion implantation) layer 270 in the vicinity of the fiber optic such that the channel waveguide 260 is disposed over core 40 of the fiber optic. Waveguide 260 has an index of refraction $n_o$ which is greater than the index of refraction n of the remaining portions of layer 270 such that optical boundaries 262 and 264 are formed on either side of waveguide 260. These boundaries, in addition to an upper boundary 266 serve to confine optical energy coupled into the overlay waveguide within channel 260 for subsequent return to the fiber optic.

As another alternative, a compound waveguide architecture 310 is depicted in FIG. 2c wherein a channel waveguide 360 is realized using a relief structure 366 on the upper surface of layer 370 disposed over substrate 20 within which the optical fiber resides. Optical boundaries 362 and 364 can be realized using such a relief structure. These boundaries define a cross-sectional area disposed orthogonal to the axis of propagation of optical energy within channel 360. One method of creating such a relief structure is disclosed in commonly assigned U.S. Pat. No. 5,396,362 entitled "High Resolution MicroMachining of Organic Crystals and Optical Modulators Formed Thereby," issued Mar. 7, 1995, the entirety of which is hereby incorporated herein by reference.

Figure 3:
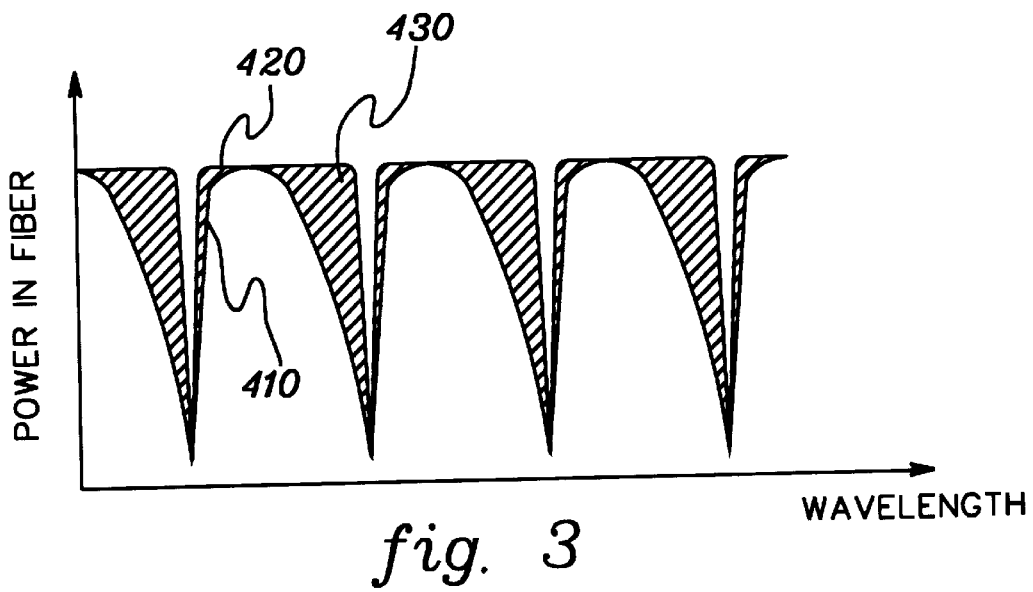
FIG. 3 is a plot of power intensity in the fiber optic compared with wavelength for a conventional "slab" overlay waveguide compared with a channel overlay waveguide in accordance with the present invention.

The above-described channel waveguide presents improved optical characteristics compared with those of standard planar or "slab" waveguides as evidenced by the spectral response plot of FIG. 3. This figure comprises a comparison of the periodic bandstop characteristic 420 of a channel waveguide superimposed over the periodic bandstop characteristic 410 of a planar or slab waveguide. These characteristics are for the optical signal propagating in fiber 30 following its interaction with channel 60. As shown, spectral characteristic 420 has a "sharper" response resulting in smaller transition regions in the bandstop areas than those of spectral characteristics 410. The difference in the spectral responses is represented as hashed region 430, which depicts the improved characteristic of the channel waveguide over a planar or slab waveguide. This spectral response is due in large part to minimization of lateral diffractive losses provided by the channel overlay waveguide.

The present invention is based on a recognition that the absence of lateral diffractive losses in a channel waveguide compared to a slab waveguide results in an entirely different theory of operation of the channel overlay waveguide. With phase matching of the fiber optic mode and the overlay waveguide mode, a planar or slab waveguide can be expected to laterally diffract energy in direct proportion to the length $L_I$ between the planar or slab waveguide and the fiber optic. Therefore, it is often a desirable characteristic of a planar or slab optical coupling device that the length $L_I$ be as long as possible to result in a deeper bandstop response at the wavelength of interest. For a channel overlay waveguide on the other hand, different physical design considerations are required because the beam is confined in the lateral direction, preferably to an area directly over or in the "vicinity of" the fiber optic. As used herein, "in the vicinity" means that the channel overlay waveguide had a sufficiently small width such that substantially all optical energy in the channel overlay will be evanescently coupled back into the fiber optic.

Figure 4:
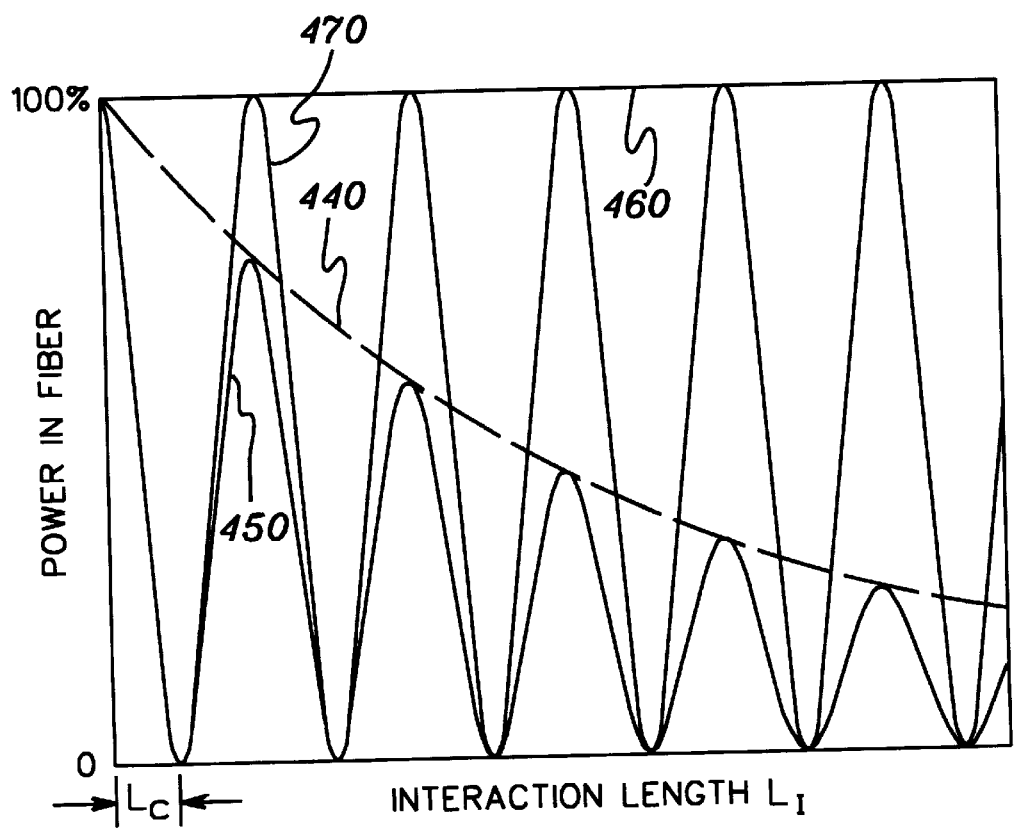
FIG. 4 is a plot of optical power intensity in a fiber optic compared with interaction length, again for a conventional "slab" overlay waveguide contrasted with a channel overlay waveguide in accordance with the present invention.

The different operational characteristics of a channel waveguide compared with a slab waveguide can be better understood with reference to FIG. 4, which comprises a plot of power in the optical fiber compared with interaction length at a fixed wavelength of interest. Power curve 450 represents the power in the optical fiber in the presence of a planar or slab overlay waveguide, while curve 470 depicts optical power in the optical fiber using a channel waveguide. Both power curves 450 & 470 are periodic in nature along length $L_I$. This periodicity is an inherent characteristic of an evanescent coupling system.

As shown, power curve 450 decays generally along curve 440 as the interaction length increases, indicating a decaying power loss in the optical fiber along the interaction length. Thus, for a planar or slab waveguide, it is generally desirable to increase the interaction length to or beyond a point at which the lateral losses provide a desired attenuation level at a wavelength of interest. This would be represented as the depth of one of the notches in the plot of FIG. 3.

For a channel waveguide system, power curve 470 although oscillating exhibits no decaying loss as the interaction length increases. This is because lateral diffraction is restricted resulting in minimal lateral loss of optical power coupled to the channel waveguide. This is depicted in FIG. 4 by the substantially horizontal decay curve 460. Due to the absence of power decay, the present invention focuses on the periodic nature of the power transfer in a channel waveguide system. The interaction length of the channel waveguide must be carefully controlled to correspond to a desired multiple of $L_C$, which represents two points in the oscillating power transfer curve 470 between which optical power in the optical fiber falls from a maximum to a minimum. The level of attenuation in a compound waveguide as presented herein is therefore a direct function of the interaction length and can be controlled by designing the interaction length in view of a desired oscillating power transfer function. Those skilled in the art will recognize that this length $L_I$ can be controlled in the side-polished fiber optic embodiment by carefully controlling the radius (R) of curvature of the fiber optic as it passes through substrate 20 in FIG. 1, as well as the depth of the polishing. By way of example, a length ($L_I$) of 5 mm might be obtained with a radius (R) curvature of 50 cm.

Optical amplification architecture and methods in accordance with the present invention for fiber optic communication systems are described below. These structures and methods of the present invention are based upon use of a compound waveguide such as described hereinabove.

Figure 5A:
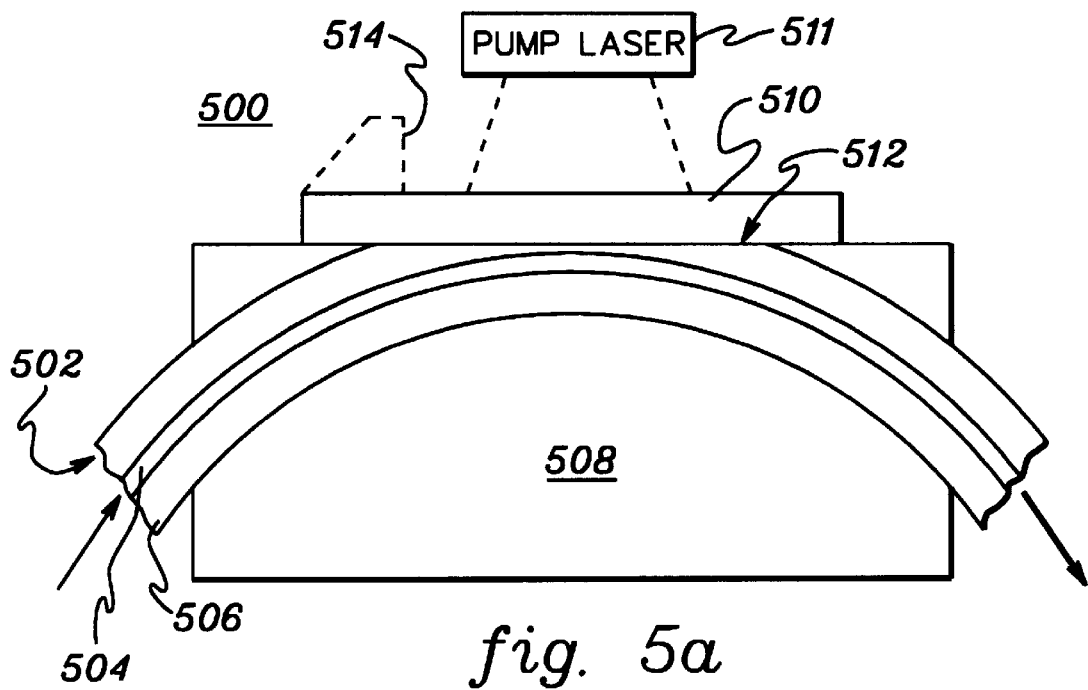
Figure 5B:
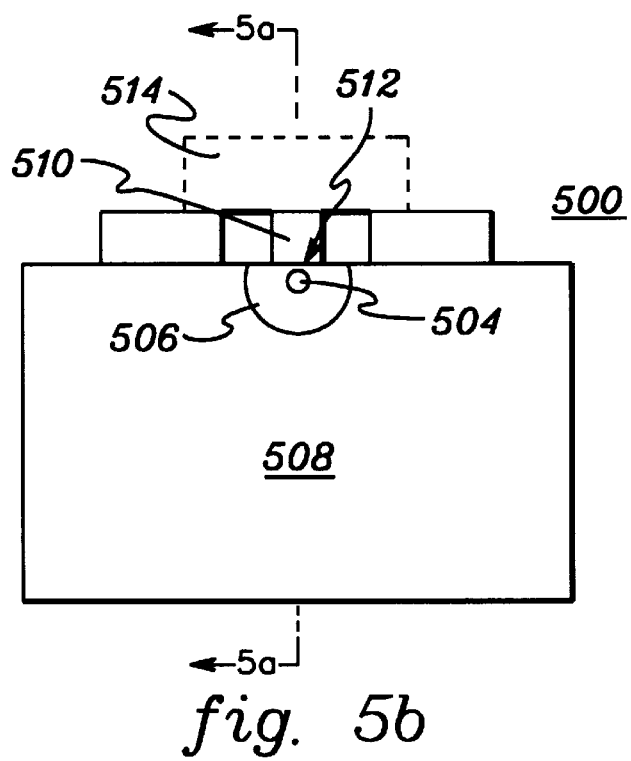

By way of introduction, one embodiment of a compound waveguide amplifier architecture, generally denoted 500, in accordance with the present invention is depicted in FIGS. 5a & 5b. Amplifier 500 includes a fiber optic 502 having a core 504 encased within cladding 506. As described above, fiber optic 502 is disposed within a block 508 and has been side-polished to remove a portion of cladding 506 to better expose core 504 to a waveguide 510 superimposed on the side-polished fiber optic. Waveguide 510 comprises a channel overlay waveguide as described above and has a coupling surface 510 through which optical energy is coupled from and to fiber optic 502. The pump source 511 will be incident on the top surface of waveguide 510.

The pump source for this device is selected to be at a frequency which is strongly absorbed by the amplifying material and which results in a large population inversion. It typically consists of a high-power continuous-wave (cw) laser diode array. For significant amplification, and noise limitation, pump power should be high enough to place the system in saturation.

Experiments have indicated that for a side polished fiber amplifier in which Nd:YAG is used as the overlay waveguide, signal gains of more than 5 dB can be achieved in the absence of a channel waveguide. Numerical calculations show that the 5 dB gain observed in a slab overlay device will translate into 13 dB in a channel waveguide device over the same distance. Optimizing the pump conditions and the interaction length should improve that by at least a factor of 2 resulting in 26 dB of gain, with the possibility of attaining much higher amplification. Furthermore, the noise figure of a device based on Nd:YAG, or any Nd-doped material, is expected to be very low because the spontaneous emission preferentially occurs at 1064 nm and not at 1319 nm.

Figure 5C:
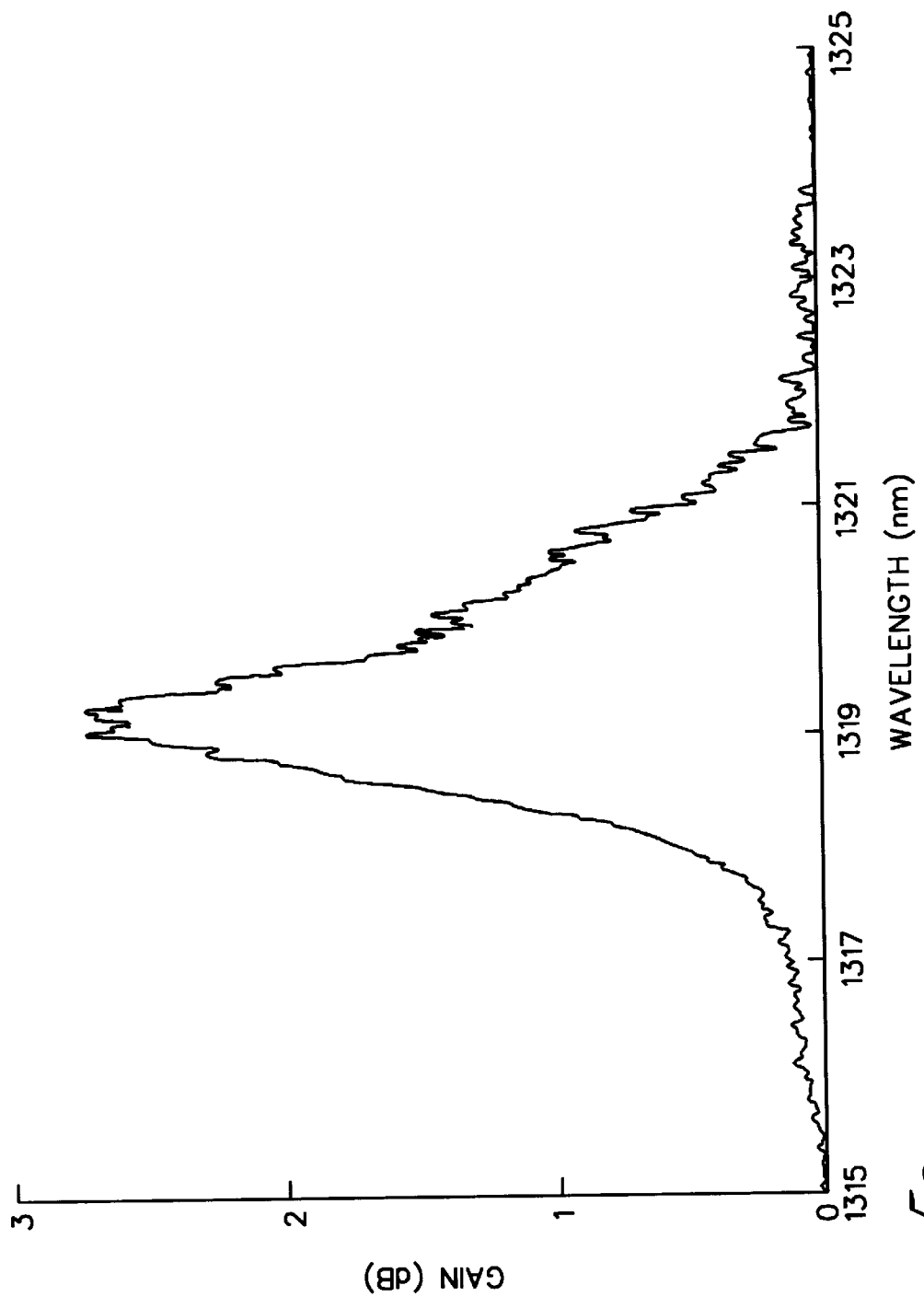
FIG. 5c is a plot of experimentally observed gain spectrum for a side-polished fiber amplifier with a Nd:YAG crystal used as the overlay waveguide, with the waveguide pumped with 700 mW of light at 808 nm.

An amplifier in accordance with the present invention, having a channel overlay waveguide, will have an operating gain bandwidth determined by the material used. In the case of narrowband crystals, such as Nd:YAG, the gain bandwidth is expected to be only 2–3 nm, as shown in FIG. 5c. (FIG. 5c depicts the experimentally observed gain spectrum for a side-polished fiber amplifier with a Nd:YAG crystal used as the overlay waveguide pumped with 700 mW of light at 808 nm.) On the other hand, by using amorphous materials such as doped glasses or vibronically broadened materials, such as Cr:YAG, the gain bandwidth is limited not by the material, which may have 100 nm of bandwidth or more, but by the coupling which will occur over some subset of the gain band. In broadband devices, gain bandwidths of 10 nm or more are expected, making these devices suitable for wavelength division multiplexing (WDM) systems.

As a second embodiment of a compound waveguide amplifier architecture in accordance with the present invention, again reference FIGS. 5a & 5b. In this second embodiment, the amplifier again includes fiber optic 502 having core 504 encased within cladding 506 as described above. Further, fiber optic 502 is disposed within a block 508 and has been side polished to remove a portion of cladding 506 to better expose core 504 to waveguide 510 superimposed on the side-polished fiber optic. Waveguide 510 again comprises a channel overlay waveguide as described above and has a coupling surface between waveguide 510 and core 504 through which optical energy is coupled from and to the fiber optic. In the second embodiment, however, a low-index matching layer 512 is preferably disposed between waveguide 510 and fiber optic 502 for enhanced phase matching of the modes of the two waveguides. Further, a prism coupler 514 (shown in phantom) couples pump beam energy into waveguide 510 as described in detail further below.

Figure 6:
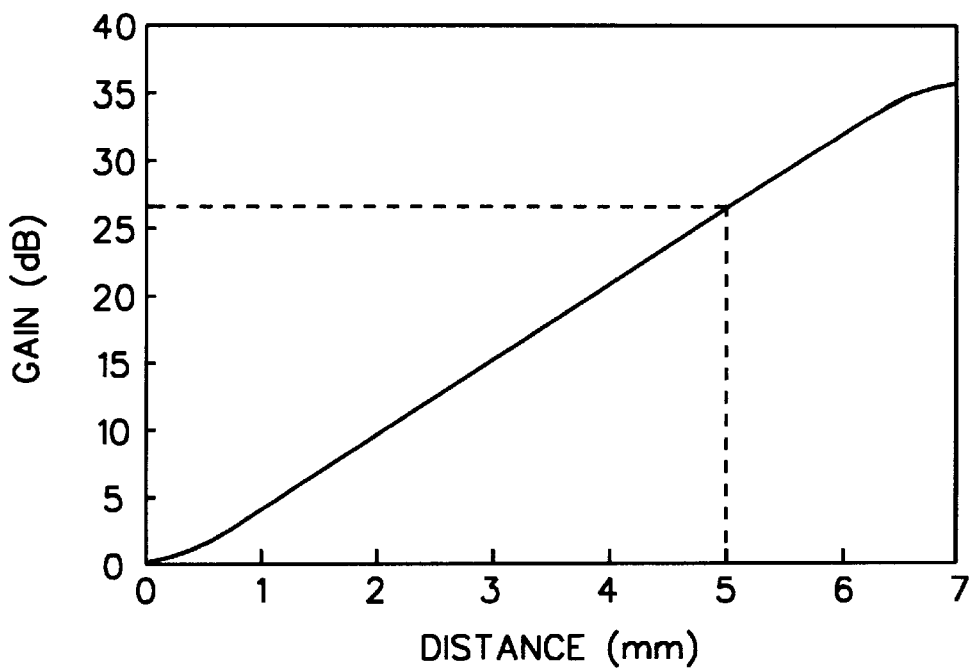
FIG. 6 is a plot of amplifier gain versus interaction length for a lithium niobate based device.

Simulations show that signal gains of approximately 300 to 400 (~25 dB) can be obtained employing a fiber/overlay amplifier architecture such as depicted in the above-described embodiments of FIGS. 5a & 5b. This gain is for a 5.0 mm long device composed of lithium niobate (LiNbO$_3$), and significantly greater gains can be obtained for longer devices as shown in FIG. 6. Analogously, larger gain can be obtained over shorter distances from materials with larger optical non-linearities, e.g. an organic salt selected from the group consisting of dimethylamino n-methylstilbazolium tosylate (DAST), 4-methoxy stilbazolium tosylate (MOST), and 3,4 dihydroxy stilbazolium tosylate. Similar gain to that of lithium niobate can be achieved using DAST. DAST and the other referenced organic salts are described in greater detail in the above-incorporated U.S. Pat. No. 5,396,362.

Figure 7:
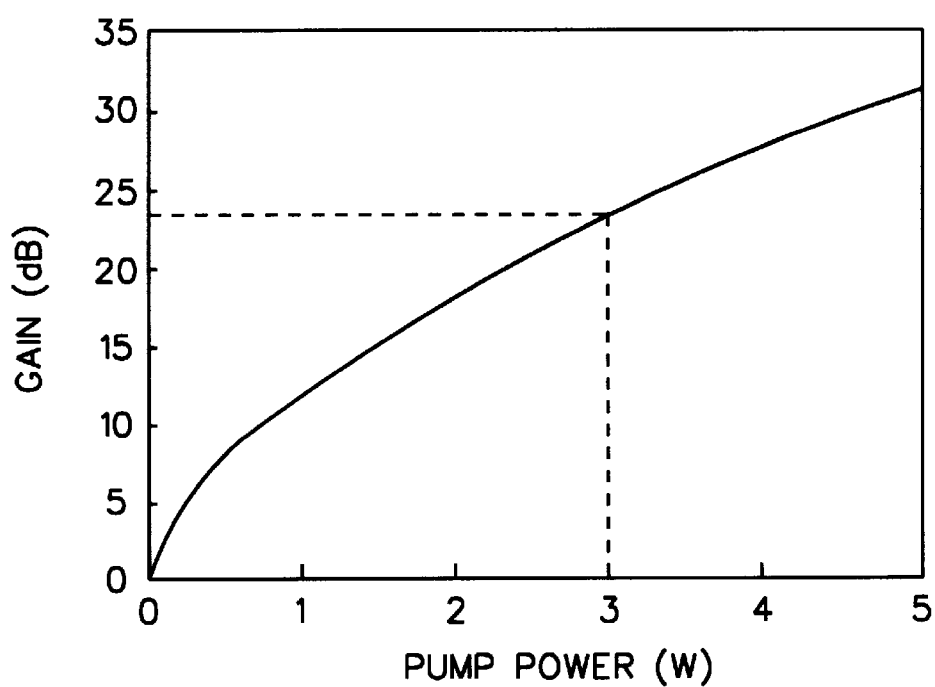
FIG. 7 is a plot of amplifier gain versus pump power for a lithium niobate based device.

Additional limits on gain are imposed by available pump power, which if increased will result in increased gain as shown in FIG. 7. A gain of 300 to 400 assumes a diode array pump source producing 3.0 W coupled into the overlay waveguide through the prism coupler. Although mode overlap between the signal beam and the pump beam may reduce available gain in the system and coupling efficiency, the gain of a 5 mm LiNbO$_3$ device should exceed 100 (20 dB). This is sufficient to allow signals to propagate 100 km in standard optical fiber (with attenuation of 0.2 dB/km) before requiring amplification, which is comparable to existing systems. Saturation of gain is observed only for input signal levels above 10 mW, which is already large enough to not require amplification.

Figure 8:
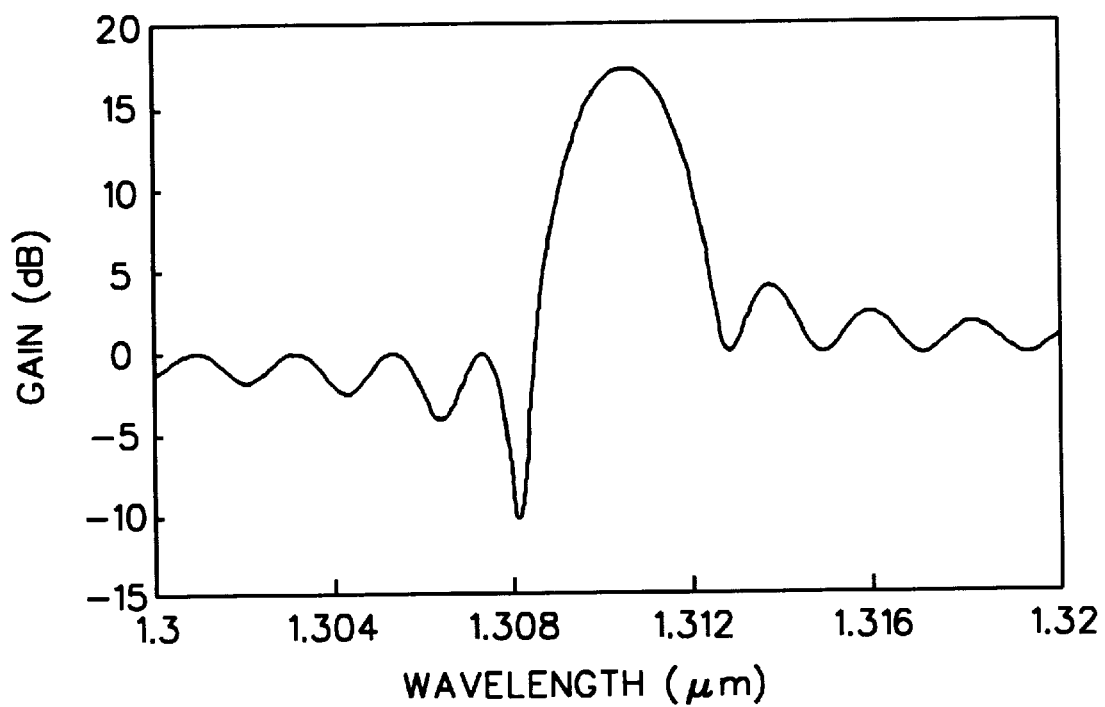
FIG. 8 is a plot of normalized dispersion-limited gain bandwidth for a lithium niobate based device.

An amplifier in accordance with the present invention, having a channel overlay waveguide, will have an operating band of ~1 nm, which as shown in FIG. 8 represents the material dispersion limits. While this bandwidth is small, it is sufficient to amplify signals in existing systems that do not use wavelength division multiplexing (WDM).

As briefly noted above, a compound waveguide amplifier in accordance with one embodiment of the present invention employs a second-order nonlinear frequency conversion process to generate gain at telecommunication wavelengths. The nonlinear process is difference frequency generation, which can successfully produce parametric gain through the process of optical parametric amplification (OPA). The nonlinear process is commercially available in optical parametric systems currently available from many laser companies. Optical parametric generation, oscillation, and amplification are currently used commercially to create widely tunable, solid-state optical sources.

The process of parametric amplification is a member of a family of second-order nonlinear phenomena that involves frequency conversion, the most notable of which is second harmonic generation. By their nature, second-order processes are considered three wave mixing because they typically involve three interacting beams. These effects can be further classified into two types: sum frequency and difference frequency. Sum frequency processes are those in which two interacting fields add up to produce a third, such as second harmonic generation. Parametric amplification belongs to the second class of phenomena known as difference frequency generation, whereby a single input beam is split into two output beams.

Figure 9:
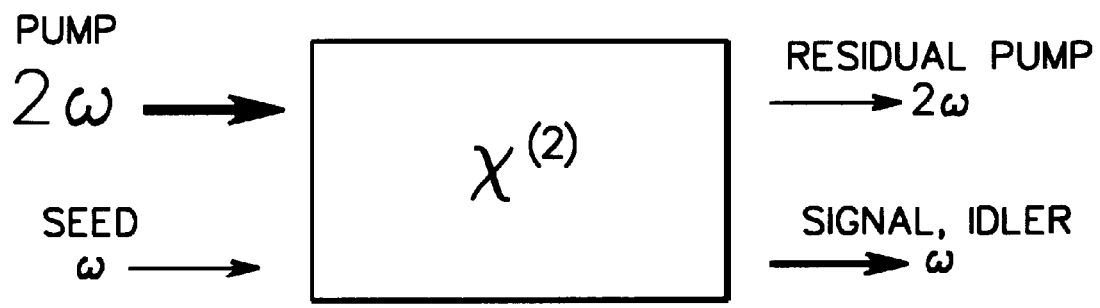
FIG. 9 is a graphical representation of optical parametric amplification employing a seed signal comprising optical energy transferred to the channel overlay waveguide from the fiber optic pursuant to the present invention.

Parametric amplification, as are all second order nonlinear optical phenomena, is governed generally by energy conservation, i.e., assuming the presence of a sufficiently strong non-linear effect in the material. This is graphically depicted in FIG. 9 where a pump beam at 2$\omega$ is seeded by optical energy $\omega$ from the coupled optical fiber, which upon passing through the non-linear material ($\chi^{(2)}$) outputs enhanced intensity $\omega$ comprising both the signal beam and the idler beam. As represented by the strength of the arrows, the seed $\omega$ is strengthened or amplified upon passing through the non-linear material.

There are many advantages to optical parametric amplification used in a compound waveguide architecture as proposed herein. With such an approach, the process has zero lifetime, which contrasts favorably with amplified spontaneous emission type amplifiers such as the above-described erbium-doped fiber amplifier. Parametric gain amplification is applicable to any phase-matchable wavelength. Waveguides can access large coefficients and can increase power densities. Finally, minimum noise is injected into the fiber optic through the optical parametric amplification process.

Consider that a given optical field with a wavelength of $\lambda$ in free-space (free-space meaning a vacuum) has associated with it a frequency V given by Equation (1)

$$\omega = 2\pi v = 2\pi c/\lambda \tag{1}$$

Wherein:

$\omega$=the angular frequency of an optical beam (in radians)

V=the non-angular frequency of an optical beam (in Hz)

$\lambda$=the wavelength of an optical beam (in vacuum)

c=speed of light in a vacuum.

The frequency of any optical field correlates to a specific energy through Equation (2).

$$E = h\omega \tag{2}$$

Wherein:

h=Planck's constant

E=the energy of the photons of an optical beam.

Recall that optical parametric amplification is a form of difference frequency generation in which a pump beam is split into two output beams referred to as the signal beam and the idler beam. The three beams are related by conservation of energy as represented by Equation (3).

$$E_{pump} = E_{signal} + E_{idler} \tag{3}$$

By combining Equations 2 & 3, the conservation of energy relation can be translated into frequency as shown by Equation (4).

$$\omega_{pump} = \omega_{signal} + \omega_{idler} \tag{4}$$

wherein:

$\omega_{pump}$=the angular frequency of the pump beam $\omega_{signal}$=the angular frequency of the signal beam $\omega_{idler}$=the angular frequency of the idler beam.

In addition to energy conversation, which determines the relationship between the frequencies of the interacting beams, there is a second parameter that determines the specific frequencies involved. This is known as the phase matching condition, and requires that the three interacting beams propagate in the material in phase to achieve the most efficient energy exchange. As a result, the ideal case is for a zero phase difference between the input beams and the output beams. Considering that the phase of a propagating beam is given by the wave-vector, the refractive index, and the distance, the phase matching condition can be written as set forth in Equation (5).

$$\Delta kL = \frac{1}{c}(\omega_{pump} n_{pump} - \omega_{signal} n_{signal} - \omega_{idler} n_{idler}) L \tag{5}$$

wherein:

$\Delta k$=the wave-vector mismatch between the pump, signal and idler beams

L=interaction length c=speed of light in vacuum $n_{pump}$=the refractive index of the material at the pump wavelength $n_{signal}$=the refractive index of the material at the signal wavelength $n_{idler}$=the refractive index of the material at the idler wavelength.

The phase-matching condition indicates that for a given pump and desired signal or idler wavelength, the refractive indices must be tuned, through angle or temperature, to minimize $\Delta kL$. In fact, for negligible pump depletion, the efficiency of the parametric amplification process is governed by $\Delta kL$ through the relation of Equation (6).

$$P_{signal}, P_{signal} \propto \frac{\sin^2(\Delta kL)}{(\Delta kL)^2} \tag{6}$$

To summarize, the operation of a parametric amplifier is governed by Equations (4), (5) and (6) to select a desired frequency and then tune the refractive indices to minimize the phase-mismatch and maximize efficiency. Since the amplifier proposed herein is based on waveguide amplification, the refractive indices can be tuned by adjusting the dimensions of the structure to use waveguide dispersion to adjust the indices of the interacting beams.

Parametric amplification is generally used in a non-degenerate sense where the signal and idler beams are different frequencies. This is typically the more useful configuration because multiple wavelengths are desired, or severe restrictions exist on pump sources and system structures. However, because of the channel waveguide geometry employed herein and the existence of diode laser sources at a variety of wavelengths, the non-invasive amplifier architecture of the present invention can be used at the degeneracy point where the signal and idler are the same wavelength (see FIG. 9), resulting in a more efficient overall amplification process. The use of the process at degeneracy restricts the pump via Equation (4) to be twice the frequency of the signal and idler beams. A key to the operation of the amplifier in this configuration is the ability to selectively excite a single mode of propagation in both the pump and seed beams.

Figure 10:
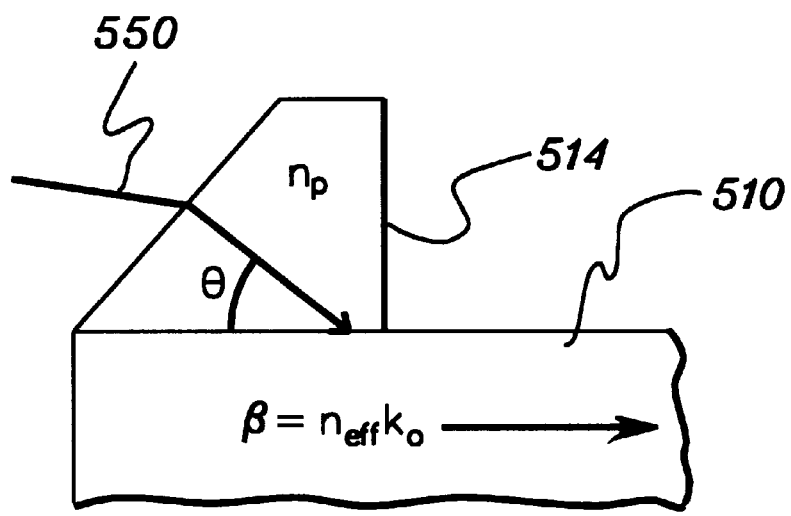
FIG. 10 is a representation of prism coupling in accordance with the present invention.

Typically, multi-mode structures such as the overlay waveguide of the present invention, are not efficient structures for frequency mixing because exciting single modes in both the pump and seed, and subsequently phase-matching these modes is difficult. The non-invasive fiber amplifier described herein, however, uses the unique property of the side-polished fiber to excite the highest-order seed mode of the structure to the exclusion of all other modes, and prism coupling is used to accomplish the same for the pump beam. Prism coupling is depicted in FIG. 10, wherein a pump beam 550 is input to channel overlay waveguide 510 through prism coupler 514. The refractive index of the prism ($n_p$) relates to the effective refractive index ($n_{eff}$) as $n_p \cdot \cos(\theta) = n_{eff}$. Each mode in waveguide 510 has a propagation constant $\beta$ associated therewith and the waveguide dispersion can be included as an effective refractive index expressed as $\beta = n_{eff} k_o$. The free-space wave-vector $k_o$ is the same as that of the input light or pump beam 550 since the wavelengths are the same. The incident angle, $\theta$, is selected such that $n_p \cos\theta = n_{eff}$ which is the condition for optimal efficiency. If the effective index of refraction ($n_{eff}$) is greater than the refractive index of the prism ($n_p$), no coupling of modes is possible, i.e., it is not possible to excite modes with larger effective indices. Based upon this it is possible to excite a single mode into which all energy is transferred. As will be understood by one of ordinary skill in the art, the overlay waveguide dimensions, the waveguide material, and the waveguide to fiber optic separation are employed to tune the overall compound system into a phase-matched condition. Again, an operational feature of the device is the ability to excite single modes of the overlay waveguide in both the seed beam and the pump beam, the seed beam being the optical energy coupled into the waveguide from the fiber optic.

Figure 11:
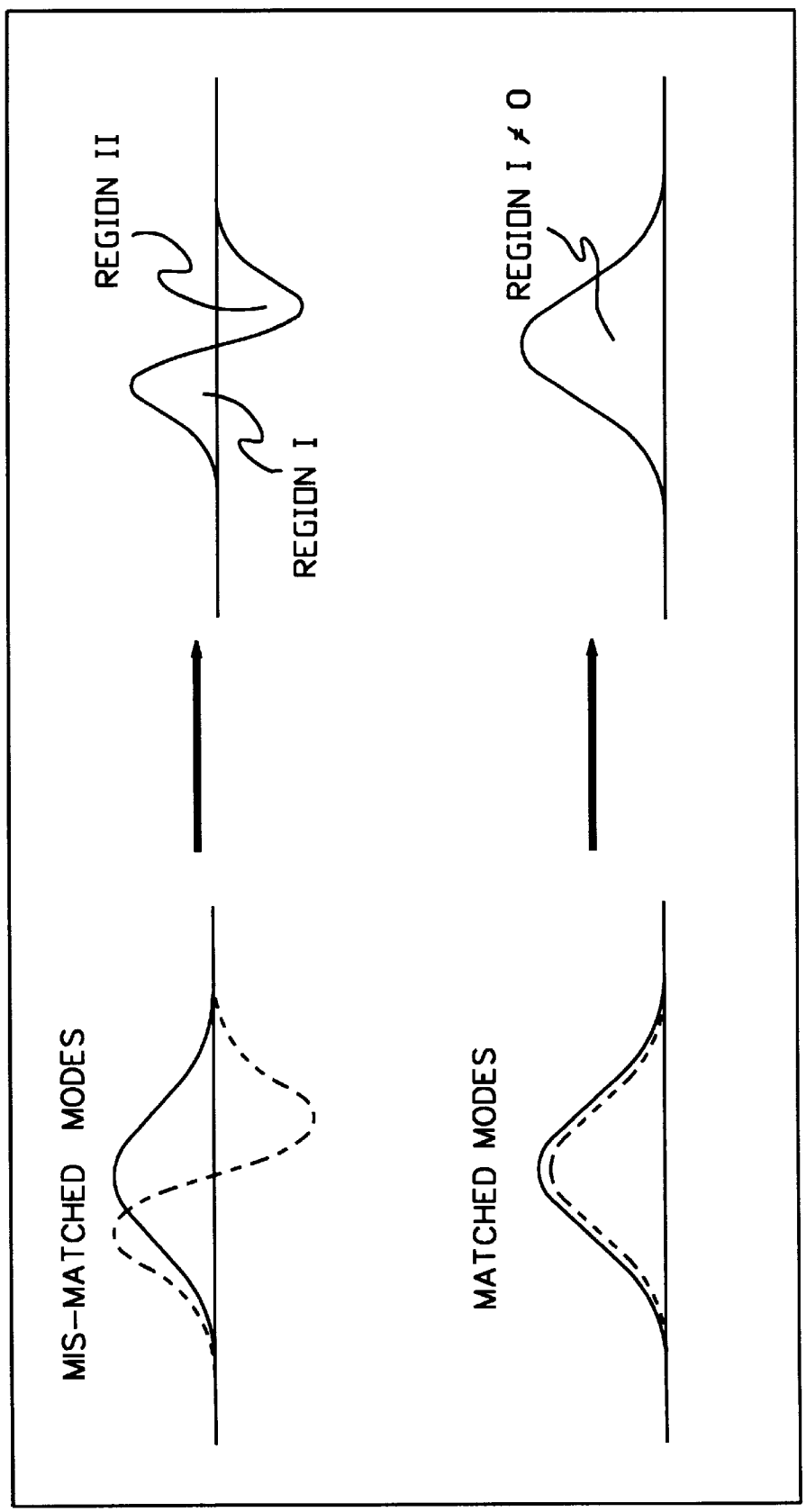
FIG. 11 depicts examples of mis-matched and matched modes useful in describing mode matching in accordance with the present invention.

Efficiency of the amplification process depends on several parameters, many of which have been discussed above. One other major contributor to efficient amplification is the field overlap of the excited modes. If the modes are well overlapped, there can be efficient conversion between the pump beam and the seed beam, whereas poor mode overlap can prohibit the process all together. Mode overlap is depicted in FIG. 11, wherein overlap is defined as the multiplication of the pump mode by the seed mode, integrated over the dimensions of the waveguide. In a mis-match mode condition, the overlapped modes are shown to produce regions I and II which taken together can cancel each other out and provide no amplification. By contrast, when modes are matched as shown, the resultant region I overlap signal comprises a value not equal to zero.

Figure 12:
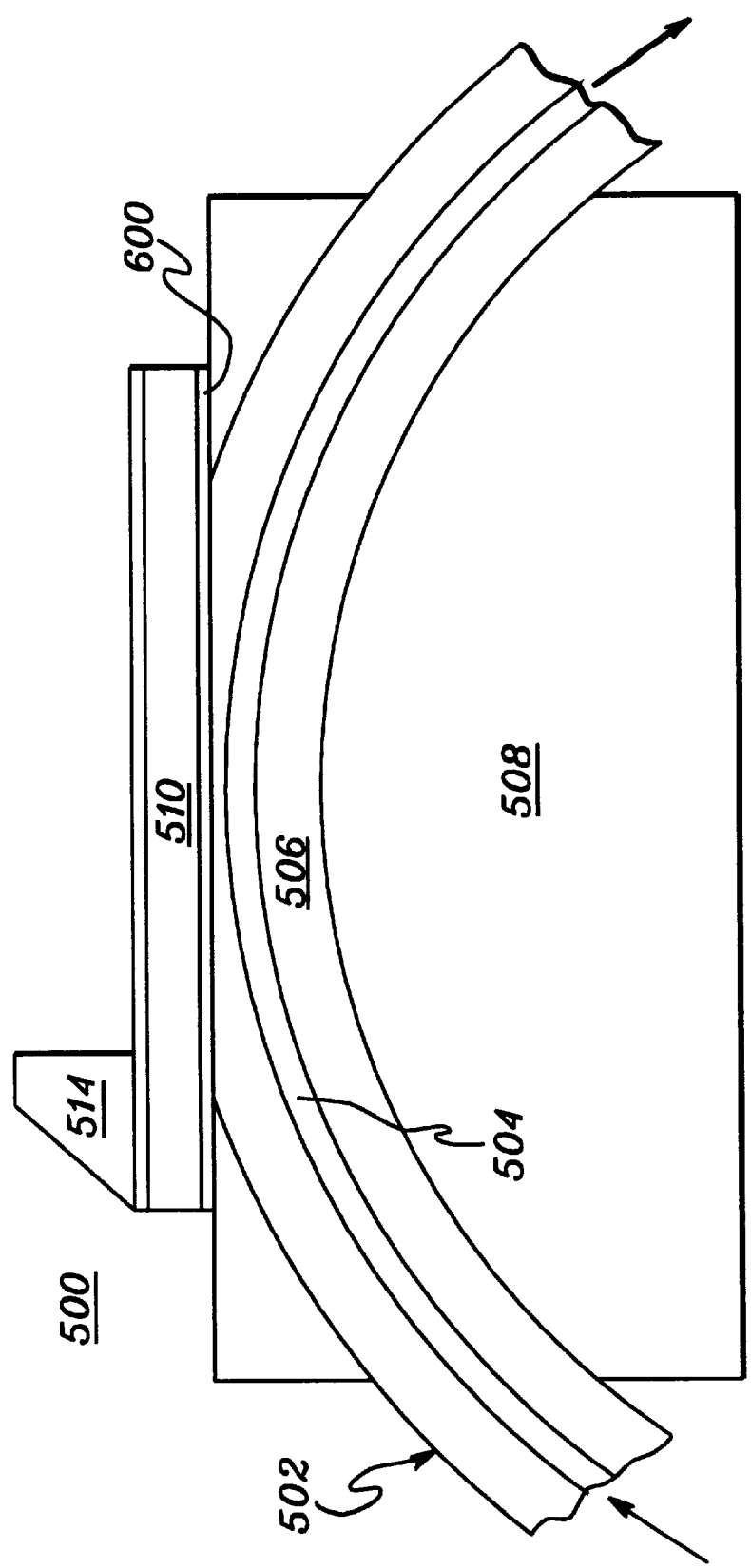
FIG. 12 is a cross-sectional view of an alternate embodiment of an optical amplifier in accordance with the present invention, wherein a low index matching layer is disposed between the coupling surface of the channel overlay waveguide and the fiber optic.

Another significant feature of an amplifier in accordance with the second embodiment of the present invention is the disposition of a low-index matching layer 600 at the coupling surface 512, for example, between a ridge-type channel waveguide 510 and the fiber optic 502 as shown in FIG. 12. Layer 600 is preferred in order to accommodate natural material dispersion of the amplifier material, and to allow all the fields of the structure to interact efficiently. Without this layer, phase-matching and amplification in accordance with the present invention is inefficient, however, with the layer, phase matching between the fiber and the overlay waveguides at the seed wavelength, and phase-matching between the pump and seed beams in the overlay can both be readily accomplished.

Another example of a specific fiber/overlay compound waveguide structure in accordance with the principles of the present invention is next presented. The general architecture consists of the components depicted in FIGS. 5a & 5b. The fiber optic portion 502 of the device comprises a standard single-mode optical fiber, such as Corning SMF-28 fiber optic having an 8.3 micron core and 125 micron total diameter (core and cladding), principally comprising cladding 506. Fiber optic 502 is embedded within a fused silica block 508, e.g., having a refractive index of 1.447. The block/fiber structure is side polished down to remove a portion of cladding 506 as shown. By way of example, side polishing may proceed until 0.5–2 microns of cladding remain.

A channel overlay waveguide is then superimposed on top of the fiber/block component and aligned with the embedded fiber such that the propagation axes of the embedded fiber and the overlay waveguide are aligned. Channel overlay waveguide 510 might comprise a ridge-type channel waveguide as depicted in FIG. 2c hereof. In such a case, the main body of overlay waveguide 510 may comprise a 5–40 microns thick Nd:glass slab overlay waveguide (e.g., Nd:ZBLAN) having a centered 0.1–3 micron thick high-index ZnS, or other transparent dielectric, ridge with a width approximately the width of the fiber core 504 of fiber optic 502. For example, assuming that fiber optic core 504 has an 8.3 micron diameter, then the width of the high-index ridge might be 10 microns.

In an alternate embodiment, a rectangular channel overlay waveguide 510 such as depicted in FIGS. 5a & 5b might be employed. Typical dimensions for such a rectangular waveguide might be 10 microns by 10 microns. Also, note that while ZBLAN is known to be difficult to form into fibers, an architecture in accordance with the present invention experiences no such limitation. Thus, 30–40 nm of gain bandwidth can be obtained. Furthermore, any material which is useful for laser applications can be applied to this architecture, including rare-earth doped crystals, rare-earth doped glasses, rare-earth based deposited films, polymers, and optically or electrically pumped semiconductors.

In this embodiment, the pump beam requires no coupling mechanism and can adequately pump the amplifier device by being incident on the top surface of the channel overlay waveguide. By way of example, the pump source could comprise an open heat sink laser diode glued to the top surface of the channel overlay waveguide. An alternate embodiment could use a multi-mode optical fiber to deliver the pump beam from the laser diode to the top surface of the channel overlay waveguide.

Again, one of ordinary skill in the art will understand that the specific dimensions and materials provided above merely comprise one example of an implementation of a fiber/overlay compound waveguide in accordance with the present invention. Other materials and/or dimensions will be apparent to those skilled in the art based on the description presented herein.

By way of completeness, a further specific example of a fiber/overlay compound waveguide structure is presented. The general architecture consists of the components depicted in FIG. 12. The fiber optic portion 502 of the device comprises a standard single-mode optical fiber, such as Corning SMF-28 fiber optic having an 8.3 micron core with 125 micron total diameter, principally comprising cladding 506. Fiber optic 502 is embedded within a fused silica block 508, e.g., having a refractive index of 1.447. The block/fiber structure is side polished down to remove a portion of cladding 506 as shown. By way of example, side polishing may proceed until 0.5–2 microns of cladding remains.

A channel overlay waveguide 510 is then superimposed on top of the fiber/block component and aligned with the embedded fiber such that propagation axes of the embedded fiber and the overlay waveguide are aligned. Channel overlay waveguide 510 might comprise a ridge-type channel waveguide as depicted in FIG. 2c hereof. In such a case, the main body of overlay waveguide 510 may comprise a 5–20 microns thick Lithium Niobate slab overlay waveguide having a centered 0.1–2 micron thick high-index ZnS ridge with a width approximately the width of the fiber core 504 of fiber optic 502. For example, assuming that fiber optic core 504 has an 8.3 micron diameter, then the width of the high index ZnS ridge might be 10 microns. In an alternate embodiment, a rectangular channel overlay waveguide such as depicted in FIGS. 5a & 5b might be employed. Typical dimensions for such a rectangular waveguide might be 10 microns by 10 microns.

Low-index matching layer 600 at the coupling interface between overlay waveguide 510 and the fiber optic 502 could comprise a 0.5–2 microns thick layer of any known low-index material, such as magnesium fluoride ($MgF_2$). In order to couple the pump beam (not shown) into overlay waveguide 510, prism coupler 514 is disposed above the waveguide as shown. One embodiment of a coupler could comprise a BK-7 glass prism coupler such as model number 01 PRS 401 manufactured by Melles Griot of Irvine, Calif. or model number 05BRO8 produced by Newport Corp. also of Irvine, Calif.. Again, one of ordinary skill in the art should understand that the specific dimensions and materials provided above merely comprise one example of an implementation of a fiber/overlay compound waveguide in accordance with the present invention. Other material and dimension examples will be apparent to those skilled in the art based on the description presented herein.

The radius of curvature of the fiber and the polishing depth are chosen so that a significant portion, for example greater than fifty (50%) percent, of the power of an optical signal in the fiber optic is transferred into the overlay waveguide and once amplified is returned from the overlay waveguide back into the fiber optic. Thus, the compound waveguide is preferably designed to transfer one beat length of energy between the fiber and the overlay. Alternatively, optical power could oscillate between the optical fiber and the overlay waveguide n beat lengths, wherein n is an integer. Transfer of optical energy into the overlay waveguide is desirable so that there is a seed signal in the overlay waveguide that can, for example, be amplified by the non-linear amplification process described above. Thus, note that transfer of even ten (10%) percent or less of optical energy of the optical signal in the fiber optic can occur and be amplified in the overlay waveguide for return back to the fiber optic.

Following amplification, the stronger signal is passed back into the optical fiber for continued transmission. Again, in one embodiment, the overlay waveguide is fabricated from a material which possess a large second order optical non-linearity. Dimensions of the waveguide are selected to allow for phase-matching between the highest-order modes of the fundamental (signal) beam and the harmonic (pump) beam. Several members of the family of inorganic materials are suitable for the overlay waveguide, including but not limited to: lithium niobate and potassium titanyl phosphate (KTP). Further performance enhancements may be obtained by using a member of the organic family of materials, such as dimethylamino n-methylstilbazolium tosylate (DAST). 4-methoxzy stilbazolium tosylate (MOST), and 3,4 dihydroxy stilbazolium tosylate, which are discussed in detail in the above-incorporated U.S. Pat. No. 5,396,362.

Figure 13A:
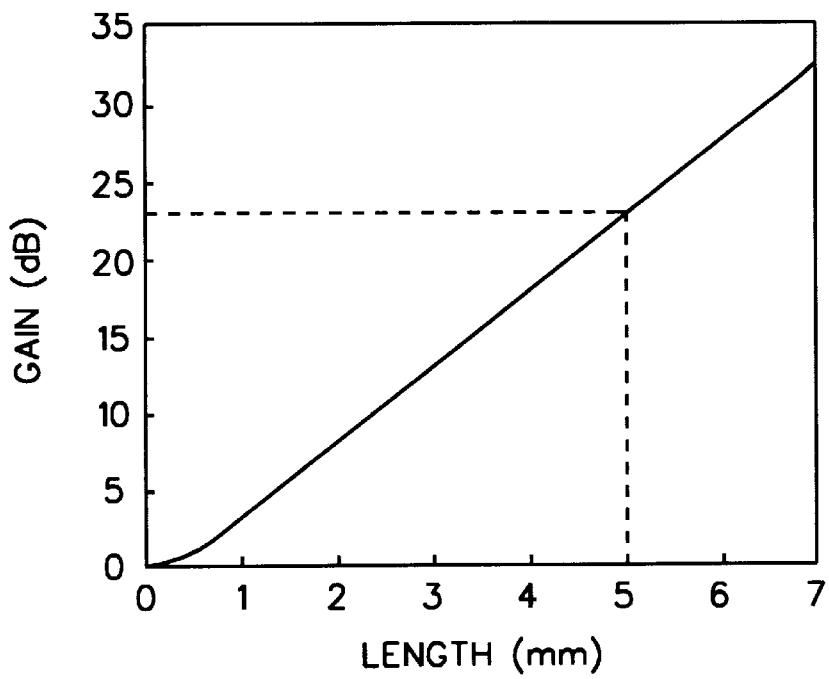
FIGS. 13a & 13b depict amplifier performance for a lithium niobate device at wavelength 1310 nm in accordance with the present invention, FIG. 13a depicting device gain versus interaction length, and FIG. 13b plots device gain versus input or pump power applied to the amplifier.
Figure 13B:
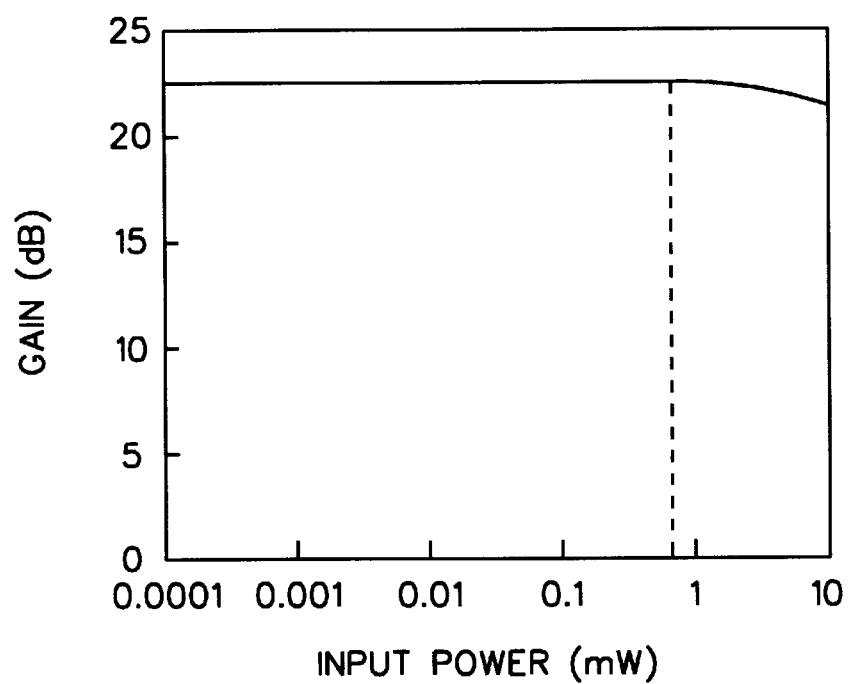

The pump source for the compound waveguide is selected to be at twice the frequency (one-half the wavelength) of the signal to be amplified. Thus, if a 1310 nm seed signal is propagating through the fiber optic, then the pump source provides a pump beam at 655 nm. The pump source will typically consist of a high-power laser diode array. For significant amplification, pump power should be 2 Watts or greater. As stated above, the pump beam is launched into the overlay waveguide via prism coupling. Compound amplifier performance is plotted in FIGS. 13a & 13b for a lithium niobate overlay waveguide amplifying a 1310 nm wavelength signal.

Figure 14:
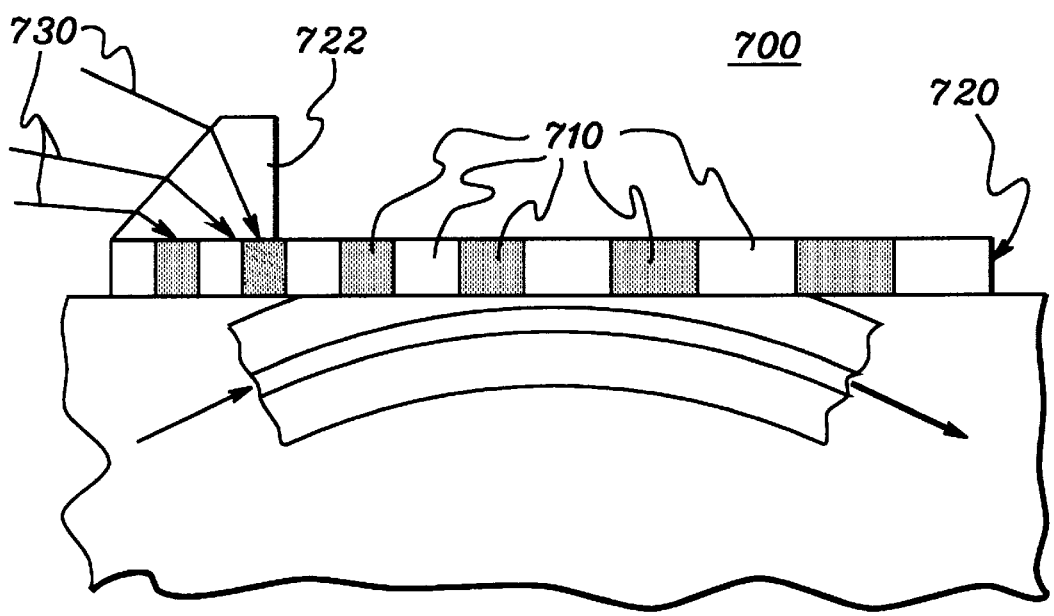
FIG. 14 is a cross-sectional view of an alternate embodiment of an optical coupler in accordance with the present invention having bandwidth enhancement.

The operating bandwidth of the channel overlay device is approximately 1 nm, but can be expanded by using a quasi-phase-matched structure in the overlay guide as depicted in FIG. 14. Bandwidth enhancement is attained by the compound waveguide architecture 700 shown through the use of chirped grating 710 as a modified overlay waveguide 720. Optionally, Barker coded waveguides could be employed. Both processes add dispersion to the system which can be tailored such that the new dispersion is added to the phase-matching condition to make Δk=0 over a much wider band of wavelengths, allowing efficient amplification to occur over a substantially enhanced bandwidth. Quasi-phase-matching is known to provide efficient frequency conversion at a given wavelength, however, by chirping the periodicity of the grating-like structure, phase-matching can be achieved over several wavelengths, thereby increasing the bandwidth of the non-linear conversion process and consequently enhancing the operating bandwidth of the amplifier. For example, chirped quasi-phase-matched structures embedded in the overlay waveguide could expand the bandwidth out to 10 or 20 nm, allowing the compound waveguide to be used in wavelength division multiplexed systems.

Bandwidth enhancement is also significant since a fiber optic can carry multiple optical signals of different wavelengths simultaneously, wherein each wavelength represents a different channel. The goal of enhanced bandwidth would be to attain amplification of each of these channels simultaneously. The tradeoff is that a slightly reduced gain results. Multiple pump beams 730 are shown incident on the prism coupler 722 in FIG. 14 since each channel will require a different pump beam wavelength. Multiple pump beams are shown by way of example only. Single pump beam embodiments are also possible. Such embodiments would expand the process slightly away from degeneracy.

Those skilled in the art will note from the above discussion that a polished fiber/overlay compound waveguide in accordance with the present invention comprises an optical amplifier for fiber optic communication systems. The device efficiently amplifies small signals at high speeds without creating discontinuity in the optical fiber network. The technique involves the use of either stimulated emission to amplify the optical signal, or non-linear frequency conversion to down-convert a high-power, short-wavelength pump to amplify the optical signal. Gain comparable to that produced by erbium-doped fiber amplifiers is attainable, but at any communication wavelength desired. Since the compound waveguide architecture of the present invention does not require discontinuity in the fiber optic system, losses typically associated with coupling signals in and out of the fiber optic are avoided, and no system instabilities are generated. Various inorganic and organic materials may be employed as the overlay waveguide.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

We claim:

1. A process for amplifying an optical signal in an optical fiber employing a channel overlay waveguide over a side-polished portion of the optical fiber, said channel overlay waveguide exhibiting optical fluorescence when stimulated, said process comprising:

(a) transferring optical energy from the optical signal in the optical fiber to the channel overlay waveguide;

(b) employing stimulated emission within said channel overlay waveguide to amplify said optical energy in the channel overlay waveguide to produce amplified optical energy; and (c) returning the amplified optical energy to the optical signal in the optical fiber, thereby amplifying said optical signal without degrading optical signal integrity.

2. The process of claim 1, wherein said returning (c) of the amplified optical energy occurs at n beat length(s) from said transferring (a) of the optical energy, wherein n is an integer $\geq 1$.

3. The process of claim 1, wherein said channel overlay waveguide exhibits optical fluorescence within a wavelength range, and wherein said transferring (a) comprises transferring optical energy having a given wavelength from the optical signal in the optical fiber to the channel overlay waveguide, wherein said given wavelength comprises a wavelength within said wavelength range within which said channel overlay waveguide exhibits optical fluorescence.

4. The process of claim 1, further comprising pumping said channel overlay waveguide with high power optical energy to produce optical fluorescence within said channel overlay waveguide, and wherein said transferring (a) comprises transferring optical energy from the optical signal to the channel overlay waveguide within a fluorescence emission bandwidth of said channel overlay waveguide.

5. The process of claim 1, wherein said transferring (a) comprises transferring optical energy greater than 50% of the optical signal in the optical fiber.

6. The process of claim 1, further comprising superimposing said channel overlay waveguide on said side-polished portion of the optical fiber, said channel overlay waveguide comprising one of a rare-earth doped crystal, a rare-earth doped glass, a rare-earth based deposited film, a polymer, and an optically/electrically pumped semiconductor.

7. The process of claim 6, wherein said channel overlay waveguide comprises neodymium-doped yttrium aluminum garnet.

8. An amplifier for amplifying an optical signal in a first waveguide employing a second waveguide, said second waveguide comprising a channel overlay waveguide, said channel overlay waveguide exhibiting optical fluorescence when stimulated, said amplifier comprising:
first evanescent means for coupling optical energy from the optical signal in the first waveguide to the channel overlay waveguide;
stimulated emissions means for amplifying the optical energy in the channel overlay waveguide to produce amplified optical energy; and
second evanescent means for returning the amplified optical energy to the optical signal in the first waveguide, thereby resulting in amplification of said optical signal without degrading optical signal integrity.

9. The amplifier of claim 8, wherein said second evanescent means comprises means for coupling said amplified optical energy back into the optical signal in the first waveguide at n beat length(s) from coupling of optical energy by said first evanescent means from said optical signal into said channel overlay waveguide, wherein n is an integer $\geq 1$.

10. The amplifier of claim 8, wherein said stimulated emissions means comprises a laser pump for providing energy to said channel overlay waveguide for inducing optical fluorescence commensurate with said first evanescent means coupling of optical energy from the optical signal in the first waveguide to the channel overlay waveguide.

11. The amplifier of claim 8, wherein said channel overlay waveguide comprises one of a rare-earth doped crystal, a rare-earth doped glass, a rare-earth based deposited film, a polymer, and an optically/electrically pumped semiconductor.

12. The amplifier of claim 8, wherein said channel overlay waveguide comprises a neodymium-doped material.

13. A compound waveguide comprising:
a side-polished fiber waveguide for propagating an optical signal along a propagation axis; and
a channel overlay waveguide positioned in optical proximity to the side-polished fiber waveguide, said channel overlay waveguide having a propagation axis aligned with the propagation axis of the fiber waveguide, and a coupling surface through which optical energy is coupled to or from the optical signal propagating in the fiber waveguide, said channel overlay waveguide constraining optical energy coupled thereto within a predefined area orthogonal to the propagation axis of the channel overlay waveguide, said predefined area being sized to maintain said optical energy in the channel overlay waveguide substantially over said fiber waveguide; and
stimulated emissions means for amplifying optical energy in said channel overlay waveguide for coupling back to the optical signal propagating in the side-polished fiber waveguide without degrading optical signal integrity.

14. The compound waveguide of claim 13, wherein said channel overlay waveguide exhibits optical fluorescence, and said stimulated emissions means comprises a laser pump for pumping energy into said channel overlay waveguide to produce a stimulated emissions bandwidth, and wherein said optical energy coupled to said channel overlay waveguide has a wavelength within said stimulated emissions bandwidth.

15. The compound waveguide of claim 14, wherein said channel overlay waveguide comprises one of a rare-earth doped crystal, a rare-earth doped glass, a rare-earth based film, a polymer, and an optically/electrically pumped semiconductor.

16. The compound waveguide of claim 13, wherein said channel overlay waveguide comprises a neodymium-doped material.

17. An optical coupler comprising:
a first waveguide for propagating an optical signal along a propagation axis;
a second waveguide positioned in optical proximity to a portion of the first waveguide, said second waveguide having a propagation axis aligned with the propagation axis of the first waveguide, and a coupling surface through which optical energy is coupled to or from the optical signal propagation in the first waveguide, and wherein said second waveguide is configured such that only one oscillation of optical energy from the optical signal occurs between the first waveguide and the second waveguide through said coupling surface;
stimulated emissions means for amplifying optical energy in the second waveguide coupled thereto from the optical signal in the first waveguide during said one oscillation of said optical energy between the first waveguide and the second waveguide; and
wherein said portion of said first waveguide comprises a side-polished portion of said first waveguide, and wherein said second waveguide comprises a channel overlay waveguide which restrains optical energy coupled to said second waveguide within a predefined area orthogonal to said propagation axis of said second waveguide, said predefined area being disposed substantially only over said first waveguide.

18. The optical coupler of claim 17, wherein said second waveguide comprises one of a rare-earth doped crystal, a rare-earth doped glass, a rare-earth based deposited film, a polymer, and an optically/electrically pumped semiconductor.

19. The optical coupler of claim 17, wherein said second waveguide comprises a neodymium-doped material.

20. An optical amplifier for coupling to a side-polished fiber optic, said optical amplifier comprising:
- a channel overlay waveguide exhibiting optical fluorescence, said channel overlay waveguide having a propagation axis alignable with a propagation axis of said side-polished fiber optic, said channel overlay waveguide including a coupling surface through which optical energy is coupled to or from an optical signal propagating in the side-polished fiber optic when the channel overlay waveguide is placed in optical proximity to the side-polished fiber optic, said channel overlay waveguide constraining optical energy coupled thereto in dimensions orthogonal to the propagation axis of the channel overlay waveguide, said constraining operating to maintain said optical energy in the channel overlay waveguide proximate to the side-polished fiber optic; and
- stimulated emissions means for amplifying optical energy in said channel overlay waveguide for coupling back to the optical signal propagating in the side-polished fiber optic without degrading optical signal integrity.

21. The optical amplifier of claim 20, wherein said channel overlay waveguide comprises one of a rare-earth doped crystal, a rare-earth doped glass, a rare-earth based deposited film, a polymer, and an optically/electrically pumped semiconductor.

22. The optical amplifier of claim 21, wherein said channel overlay waveguide comprises a neodymium-doped material.

23. A method for fabricating a non-invasive optical amplifier for amplifying an optical signal in an optical fiber, said method comprising:

(a) obtaining a side-polished portion of the optical fiber;

(b) superimposing a channel overlay waveguide exhibiting an optical fluorescence over the side-polished portion of the optical fiber, said channel overlay waveguide having a propagation axis aligned with a propagation axis of said optical fiber, said channel overlay waveguide including a coupling surface through which optical energy is evanescently coupled to or from the optical signal propagating in the optical fiber, said channel overlay waveguide constraining optical energy coupled thereto within a predefined area orthogonal to the propagation axis of the channel overlay waveguide, said predefined area being sufficiently small to maintain said optical energy in the channel overlay waveguide proximate to said optical fiber; and (c) providing means for establishing a stimulated emissions amplification signal within said channel overlay waveguide for amplifying optical energy coupled into said channel overlay waveguide from said side-polished portion of said optical fiber.

24. The method of claim 23, wherein said superimposing (b) further comprises configuring said channel overlay waveguide with a length to allow optical energy evanescently coupled to the channel overlay waveguide from the fiber optic to be evanescently returned to the fiber optic within a single beat length.

25. The method of claim 24, wherein said superimposing (b) includes providing said channel overlay waveguide as a ridge-type channel overlay waveguide.

* * * * *